United States Patent
Saito

(10) Patent No.: US 9,873,778 B2
(45) Date of Patent: Jan. 23, 2018

(54) RUBBER COMPOSITION AND TIRE USING THE SAME

(71) Applicant: BRIDGESTONE CORPORATION, Tokyo (JP)

(72) Inventor: Koichi Saito, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 4 days.

(21) Appl. No.: 14/888,150

(22) PCT Filed: May 2, 2014

(86) PCT No.: PCT/JP2014/062187
§ 371 (c)(1),
(2) Date: Oct. 30, 2015

(87) PCT Pub. No.: WO2014/181776
PCT Pub. Date: Nov. 13, 2014

(65) Prior Publication Data
US 2016/0053098 A1    Feb. 25, 2016

(30) Foreign Application Priority Data
May 7, 2013    (JP) .................................. 2013-097622

(51) Int. Cl.
*C08L 9/06*    (2006.01)
*B60C 1/00*    (2006.01)
(Continued)

(52) U.S. Cl.
CPC .................. *C08L 9/06* (2013.01); *B60C 1/00* (2013.01); *B60C 1/0016* (2013.01); *C08K 3/04* (2013.01);
(Continued)

(58) Field of Classification Search
CPC ...................................................... C08L 9/06
See application file for complete search history.

(56) References Cited

U.S. PATENT DOCUMENTS 6,153,684 A    11/2000    Shieh et al.
6,197,870 B1    3/2001    Sakakibara
(Continued)

FOREIGN PATENT DOCUMENTS

EP    1616905 A1    1/2006
EP    2348068 A1    7/2011
(Continued)

OTHER PUBLICATIONS

English Translation of JP2011116920 (A)—dated Jun. 16, 2011 dated May 22, 2017 at https://worldwide.espacenet.com/publicationDetails/biblio?CC=JP&NR=2011116920A&KC=A&FT=D&ND=3&date=20110616&DB=EPODOC&locale=en_EP#.*

(Continued)

*Primary Examiner* — Lanee Reuther
(74) *Attorney, Agent, or Firm* — Sughrue Mion, PLLC

(57) ABSTRACT

Provide are a rubber composition for tire which is excellent in a wet grip performance and abrasion resistance and which has small rolling resistance and a low fuel consumption, and a tire prepared by using the above rubber composition. The rubber composition is prepared by compounding 100 parts by mass of a rubber component comprising a styrene-butadiene rubber or a styrene-butadiene rubber and a butadiene rubber with 2 to 200 parts by mass of carbon black as a reinforcing filler, wherein the carbon black has at least a hydrogen release rate of 0.2% by mass or more and/or a ratio $N_2SA/CTAB$ of 1.2 to 1.5 in which $N_2SA$ is a nitrogen adsorption specific surface area and CTAB is a cetyltributylammonium bromide adsorption specific surface area, and has a $N_2SA$ of 160 to 300 $m^2/g$.

5 Claims, 1 Drawing Sheet

(51) Int. Cl.
*C08K 3/04* (2006.01)
*C08L 9/00* (2006.01)
*C08L 15/00* (2006.01)

(52) U.S. Cl.
CPC ................. *C08L 9/00* (2013.01); *C08L 15/00* (2013.01); *C08L 2205/02* (2013.01); *Y02T 10/862* (2013.01)

(56) References Cited

U.S. PATENT DOCUMENTS

| 7,338,999 | B2 | 3/2008 | Yagi et al. | |
|---|---|---|---|---|
| 2003/0004249 | A1 | 1/2003 | Yagi et al. | |
| 2005/0096424 | A1* | 5/2005 | Otsuji | C08L 9/00 524/496 |
| 2008/0269380 | A1 | 10/2008 | Mamiya et al. | |
| 2013/0274375 | A1* | 10/2013 | Matsushita | C08L 7/00 523/156 |

FOREIGN PATENT DOCUMENTS

| JP | H05222246 A | 8/1993 | | |
|---|---|---|---|---|
| JP | 6-500138 A | 1/1994 | | |
| JP | 2000-80302 A | 3/2000 | | |
| JP | 2002338750 A | 11/2002 | | |
| JP | 200355503 A | 2/2003 | | |
| JP | 2003261795 A | 9/2003 | | |
| JP | 2003-292821 A | 10/2003 | | |
| JP | 2005139230 A | 6/2005 | | |
| JP | 2005213353 A | 8/2005 | | |
| JP | 2005/272729 A | 10/2005 | | |
| JP | 2007112983 A | 5/2007 | | |
| JP | 200940904 A | 2/2009 | | |
| JP | 201179876 A | 4/2011 | | |
| JP | 2011116920 A | * | 6/2011 | |
| JP | WO 2012043829 A1 | * | 4/2012 | ............... C08L 7/00 |
| JP | 2012158661 A | 8/2012 | | |
| WO | 2007/066689 A1 | 6/2007 | | |
| WO | 2012043829 A1 | 4/2012 | | |

OTHER PUBLICATIONS

Communication dated Apr. 1, 2016 from the European Patent Office in counterpart application No. 14794229.6.
International Preliminary Report on Patentability dated Nov. 19, 2015, issued by the International Bureau in corresponding International Application No. PCT/JP2014/062187.

* cited by examiner

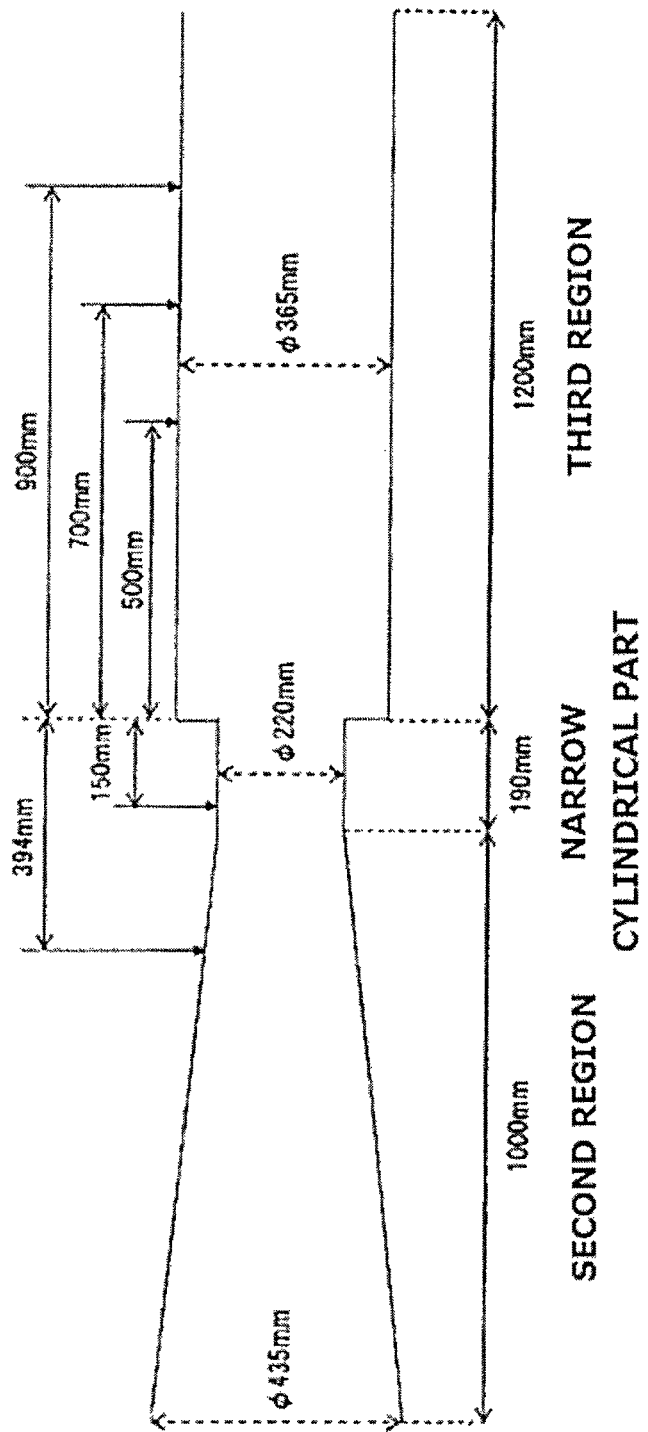

RUBBER COMPOSITION AND TIRE USING THE SAME

CROSS REFERENCE TO RELATED APPLICATIONS

This application is a National Stage of International Application No. PCT/JP2014/062187 filed May 2, 2014, claiming priority based on Japanese Patent Application No. 2013-097622, filed May 7, 2013, the contents of all of which are incorporated herein by reference in their entirety.

TECHNICAL FIELD

The present invention relates to a rubber composition, specifically to a rubber composition for tire which is excellent in a wet grip performance and abrasion resistance and which has small rolling resistance, and a tire prepared by using the rubber composition.

BACKGROUND ART

In accordance with an increased interest in safety of cars, requests for not only a low fuel consumption but also steering stability have been increased. In order to meet the requests, tires highly satisfying low heat build-up achieved by reducing rolling resistance, steering stability on wet road surfaces and dry road surfaces, and abrasion resistance in tire performances have been required. Also, in order to achieve such requests as described above, reinforcing fillers and rubber components are tried to be improved.

Carbon black has so far been used as a filler for reinforcing rubbers. This is attributable to that carbon black can provide a rubber composition with high abrasion resistance. However, it is difficult to obtain by using singly carbon black a rubber composition in which a wet grip performance, abrasion resistance and a low fuel consumption are balanced at a high level, and silica is compounded instead of carbon black as an improving method therefor. However, it has been found that when silica is used as a filler, a blending amount of carbon black is relatively reduced, so that the rubber composition is inevitably reduced in fracture strength and abrasion resistance. Also, involved therein is the problem that silica has inferior dispersibility in rubber and that a rubber composition is increased in a Mooney viscosity in kneading and inferior in processability such as extrusion.

Rubber compositions for tire tread containing rubber components and inorganic compound powders in addition to carbon black and silica as fillers for the purpose of obtaining rubber compositions which are excellent in a low fuel consumption and a wet grip performance without lowering abrasion resistance are proposed in patent documents 1 to 3.

However, in the rubber compositions described in the patent documents 1 to 3, the inorganic compound powders have to be compounded in a relatively large amount in order to obtain a satisfactory effect of improving a wet grip performance and a fuel consumption. In the case, the abrasion resistance tends to be readily reduced, and therefore a rubber composition for tire which is further excellent in a balance between a wet grip performance, abrasion resistance and a low fuel consumption is not obtained.

Also, a rubber composition for tire tread which is improved in a wet grip performance and abrasion resistance by using carbon black specified in a characteristic calculated from two-dimensional projection image analysis of aggregates and properties such as DBP, $N_2SA$ in addition to a diene base rubber component and silica is proposed in patent document 4. However, it does not sufficiently satisfy as well a low fuel consumption in addition to a wet grip performance and abrasion resistance.

PRIOR ART DOCUMENTS

Patent Documents

Patent document 1: Japanese Patent Application Laid-open 2002-338750
Patent document 2: Japanese Patent Application Laid-open 2003-55503
Patent document 3: Japanese Patent Application Laid-open 2005-213353
Patent document 4: Japanese Patent Application Laid-open 2012-158661

OUTLINE OF THE INVENTION

Problems to be Solved by the Invention

The present invention has been made in light of such existing situations as described above, and a purpose thereof is to provide a rubber composition for tire which is prepared by using carbon black having specific properties as a reinforcing filler and which is excellent in a wet grip performance and abrasion resistance and has small rolling resistance and a low fuel consumption, and a tire prepared by using the rubber composition.

Means for Solving the Problems

Intense studies repeated by the present inventors have resulted in finding that the object described above can be achieved by compounding a rubber component comprising a styrene-butadiene rubber (SBR) or a styrene-butadiene rubber (SBR) and a butadiene rubber (BR) with a specific amount of carbon black of a fine particle diameter having a high surface activity in a rubber composition for tire, and thus the present invention has come to be completed.

That is, the present invention relates to a rubber composition prepared by compounding 100 parts by mass of a rubber component comprising a styrene-butadiene rubber (SBR) or a styrene-butadiene rubber (SBR) and a butadiene rubber (BR) with 2 to 200 parts by mass of carbon black as a reinforcing filler, wherein the carbon black has at least a hydrogen release rate of 0.2% by mass or more and/or a ratio $N_2SA/CTAB$ of 1.2 to 1.5 in which $N_2SA$ is a nitrogen adsorption specific surface area and CTAB is a cetyltrimethylammonium bromide adsorption specific surface area, and wherein the carbon black has a nitrogen adsorption specific surface area ($N_2SA$) of 160 to 300 $m^2/g$, and it relates to a tire prepared by using the rubber composition.

Effects of the Invention

According to the present invention, obtained are a rubber composition for tire which is excellent in a wet grip performance and abrasion resistance and has small rolling resistance and a low fuel consumption, and a tire prepared by using the rubber composition.

BRIEF DESCRIPTION OF THE DRAWINGS

FIG. 1 is a drawing showing an outline of a production furnace for the carbon blacks used in the examples.

MODE FOR CARRYING OUT THE INVENTION

The embodiments of the present invention shall be explained below in detail.

The rubber composition of the present invention is prepared by compounding 100 parts by mass of a rubber component comprising a styrene-butadiene rubber (SBR) or a styrene-butadiene rubber (SBR) and a butadiene rubber (BR) with 2 to 200 parts by mass of carbon black of a fine particle diameter having a high surface activity.

The rubber component used in the present invention includes styrene-butadiene rubber (SBR) and butadiene rubber (BR), and it comprises preferably a styrene-butadiene rubber (SBR) and a butadiene rubber (BR) in which the butadiene rubber accounts for 40% by mass or less. Further, the butadiene rubber is more preferably a modified butadiene rubber in which a functional group having high reactivity with carbon black is introduced into an active site in a molecule. The modified butadiene rubber is, for example, a butadiene rubber having a modified group containing at least one selected from a silicon atom, a tin atom, a sulfur atom, an oxygen atom and a titanium atom in any of a polymerization active terminal, a polymerization initiation terminal and a polymer chain, and/or a modified group containing a structure selected from primary amine, secondary amine, tertiary amine and cyclic amine.

The rubber composition of the present invention can be improved in a wet grip performance and abrasion resistance by compounding novel carbon black having specific characteristics. A blending amount of the carbon black is 2 to 200 parts by mass, preferably 5 to 100 parts by mass and more preferably 5 to 50 parts by mass based on 100 parts by mass of the rubber component. If a blending amount of the carbon black is less than 2 parts by mass, the abrasion resistance is deteriorated. Also, if a blending amount of the carbon black exceeds 200 parts by mass, the low fuel consumption gets worse.

The carbon black used in the present invention is novel carbon black having the following characteristics:
1. a hydrogen release rate is 0.2% by mass or more, or
2. a ratio of $N_2SA/CTAB$ is 1.2 to 1.5.

It is further preferably novel carbon black having at least one of the following characteristics:
3. a nitrogen adsorption specific surface area ($N_2SA$) is 160 to 300 $m^2/g$,
4. a dibutyl phthalate (DBP) absorption amount is 100 to 150 ml/100 g,
5. an iodine, adsorption specific surface area (IA) is 180 to 300 $m^2/g$,
6. a tinting strength is 120 to 150, and
7. a light transmittance of toluene extract is 90 or more.

The hydrogen release rate described above is obtained by showing a generating amount of hydrogen in terms of a mass fraction, wherein carbon black dried in a constant temperature dryer of 105° C. for 1 hour is cooled down to room temperature in a desiccator and then put in a tin-made tubular sample vessel; it is pressed and tightly sealed, and it is heated at 2000° C. for 15 minutes under an argon stream by means of a hydrogen analyzer to measure an amount of hydrogen gas generated and determine a mass fraction. The larger the amount of hydrogen generated is, the more the abrasion resistance is enhanced.

The nitrogen adsorption specific surface area ($N_2SA$) is measured according to JIS K6217-2.

The nitrogen adsorption specific surface area ($N_2SA$) is preferably 160 to 300 $m^2/g$, further preferably 180 to 240 $m^2/g$. If $N_2SA$ is less than 160 $m^2/g$, the abrasion resistance is deteriorated, and if it exceeds 300 $m^2/g$, the rolling resistance gets worse.

The CTAB adsorption specific surface area is measured according to JIS K6217-3.

The ratio of the specific surface areas $N_2SA/CTAB$ is preferably 1.2 to 1.5. If the ratio of the specific surface areas $N_2SA/CTAB$ is less than 1.2, the abrasion resistance is deteriorated, and if it is larger than 1.5, the rolling resistance gets worse.

The hydrogen release rate and the ratio of the nitrogen adsorption specific surface area ($N_2SA$) and the cetyltrimethylammonium bromide adsorption specific surface area (CTAB), $N_2SA/CTAB$, each described above are indices representing a surface active characteristic of carbon black. These values of the carbon black used in the present invention fall in the ranges described above.

Further, the DBP absorption amount is measured according to JIS K6217-4 oil absorption amount A method.

The DBP absorption amount is 100 to 150 ml/100 g, preferably 110 to 140 ml/100 g. If the DBP absorption amount is less than 100 ml/100 g, the abrasion resistance is short. Further, molding processability of the rubber composition is reduced, and dispersibility of the carbon black is deteriorated, so that a reinforcing performance in the rubber composition is not sufficiently obtained. If the DBP absorption amount exceeds 150 ml/100 g, the viscosity is increased, and the processability gets worse.

The iodine adsorption specific surface area (IA) is measured according to JIS K6217-1.

The IA is 180 to 300 $m^2/g$, preferably 200 to 270 $m^2/g$.

Also, the tinting strength of the carbon black used in the present invention is measured by photochron method described in JIS K6217-5, and it is 120 to 150, preferably 130 to 140.

The light transmittance of toluene extract is measured according to a method described in JIS K6218-4, and it is preferably 90 or more. If it is less than 90, the rolling resistance is likely to get worse.

The carbon black having the characteristics described above can be produced by controlling production conditions such as a raw material supply part, a raw material supply rate, a raw material supply temperature, a fuel oil supply rate, an air supply rate for fuel atomization, an air supply rate for burning, an air temperature for burning and a reaction termination part by means of an ordinary production apparatus for carbon black.

In the rubber composition of the present invention, a wet grip performance is improved by compounding silica. All commercially available products can be used as the silica. Among them, wet silica, dry silica and colloidal silica are preferably used, and the wet silica is particularly preferably used. The silica having a BET specific surface area (measured according to ISO 5794/1) of 50 to 300 $m^2/g$, preferably 100 to 230 $m^2/g$ is used. If a BET specific surface area of the silica is less than 50 $m^2/g$, the reinforcing property as a filler is unsatisfactory, and the abrasion resistance is reduced. Also, if a BET specific surface area of the silica exceeds 300 $m^2/g$, it becomes difficult to disperse well the silica, so that an effect of improving the wet grip performance is not sufficiently obtained.

Commercially available products such as a trade name "Nipsil AQ" (BET specific surface area=190 $m^2/g$) manufactured by Tosoh Silica Corporation, a trade name "Ultrtasil VN3" (BET specific surface area=175 $m^2/g$) manufactured by Degussa AG can be used as the silica described above. The silica may be used alone or in combination of two or more kinds thereof.

In the rubber composition used for tire according to the present invention, a blending amount of the silica is 20 to 130 parts by mass, preferably 50 to 130 parts by mass based on 100 parts by mass of the diene base rubber in order to satisfy the low heat build-up and the abrasion resistance. If a blending amount of the silica is less than 20 parts by mass, an effect of improving the wet grip performance is not sufficiently obtained. Also, if a blending amount of the silica exceeds 130 parts by mass, the abrasion resistance is reduced.

Also, dispersibility of the silica in the diene base rubber can be improved by compounding a silane coupling agent together with the silica, and therefore that is preferred. A blending amount of the silane coupling agent is preferably 3 to 15% by mass, more preferably 4 to 10% by mass based on a blending amount of the silica. If a blending amount of the silane coupling agent is less than 3% by mass, dispersibility of the silica cannot sufficiently be improved. Also, if a blending amount of the silane coupling agent exceeds 15% by mass, the silane coupling agents themselves are aggregated and condensed, and the desired effect cannot be obtained.

The kind of the silane coupling agent shall not specifically be restricted, and sulfur-containing silane coupling agents are preferred. Capable of being shown as the examples of the sulfur-containing silane coupling agents are, for example, bis(3-triethoxysilylpropyl)tetrasulfide, bis(3-triethoxysilylpropyl)disulfide, 3-trimethoxysilylpropylbenzothiazole tetrasulfide, γ-mercaptopropyltriethoxysilane, 3-octanoylthiopropyltriethoxysilane, and the like.

In the present invention, the rubber composition is provided with both a wet grip performance and abrasion resistance by using both the silica and the carbon black. The total of the blending amounts of the silica and the carbon black is 60 to 160 parts by mass, preferably 70 to 140 parts by mass based on 100 parts by mass of the diene base rubber. If the total of the silica and the carbon black is less than 60 parts by mass, the sufficiently high wet grip performance is not obtained. Also, if the total of the silica and the carbon black exceeds 160 parts by mass, the persistence of the wet grip performance is deteriorated, and the abrasion resistance gets worse.

The rubber composition of the present invention can be compounded with various additives usually used for rubber compositions for tire, such as vulcanizing agents or cross-linking agents, vulcanization accelerators, various inorganic fillers, various oils, antioxidants and plasticizers. The above additives can be kneaded to prepare rubber compositions by ordinary methods, and the rubber compositions can be used for vulcanization or cross-linking. The blending amounts of the additives can be conventional blending amounts as long as they do not go against the objects of the present invention.

The rubber composition of the present invention can be produced by mixing the respective components described above by means of an ordinary kneading machine, for example, a Banbury mixer, a kneader, a roll and the like.

A pneumatic tire produced by using the rubber composition for tire according to the present invention can be improved in a wet grip performance, abrasion resistance and a low fuel consumption to a higher level than ever, and it can suitably be used as a pneumatic tire for various vehicles.

EXAMPLES

The present invention shall be explained below in detail with reference to examples, but the present invention shall by no means be restricted to the following examples.

Production Examples 1 to 6

Production of Carbon Blacks CB1 to 6

A carbon black production furnace in which a first region (not illustrated): a fuel introducing part (an inside diameter: 680 mm, a length: 900 mm), a second region: a raw material introducing part (an upper stream end inside diameter: 435 mm, a lower stream end inside diameter: 220 mm, a length: 1000 mm, a taper angle: 6.1°), a narrow cylindrical part (an inside diameter: 220 mm, a length: 190 mm), and a third region: a reaction continuation and cooling chamber equipped with a quenching hydraulic spraying equipment for reaction termination (an inside diameter: 365 mm, a length: 1200 mm) were arranged from an upper stream shown in FIG. 1 was used, and a heavy oil shown in Table 1 was used as a raw material oil to produce carbon blacks of CB1 to 6 under operating conditions shown in Table 2.

TABLE 1

| Specific gravity (JIS K2249) (15/4° C.) | | 1.0833 |
|---|---|---|
| Kinetic viscosity (JIS K2283) (mm²/s at 50° C.) | | 120.5 |
| Moisture (JIS K2275) (%) | | 0.1 |
| Residual carbon (JIS K2210) (%) | | 6.91 |
| Sulfur content (JIS K2213) (%) | | 0.94 |
| Carbon content (%) | | 90.4 |
| Hydrogen content (%) | | 7.6 |
| BMCI *1 | | 131 |
| Distillation characteristic (° C.) | I.B.P. *2 | 213 |
| | 10% fraction point | 310 |
| | 30% fraction point | 371 |
| | 50% fraction point | 381 |

*1 BMCI: Bureau of Mines Correlation Index (index of The United States Bureau of Mines)
*2 I.B.P.: Initial Boiling Point (first fraction point)

TABLE 2

| | CB1 | CB2 | CB3 | CB4 | CB5 | CB6 |
|---|---|---|---|---|---|---|
| Air supply rate for burning (kg/hr) | 14000 | 14700 | 14700 | 14700 | 14500 | 14500 |
| Air temperature for burning (° C.) | 767 | 759 | 702 | 707 | 762 | 711 |
| Fuel oil supply rate (kg/hr) | 755 | 785 | 785 | 785 | 775 | 785 |
| Raw material oil supply rate (kg/hr) | 3050 | 1950 | 2000 | 1950 | 2000 | 2000 |
| Raw material oil pre-heating temperature (° C.) | 313 | 322 | 315 | 282 | 297 | 322 |
| Discharge pressure (MPa) | 2.75 | 1.35 | 1.84 | 1.56 | 1.40 | 2.08 |
| Potassium addition rate (ppm) | 1.0 | 2.9 | 0 | 7.1 | 2.8 | 0 |

TABLE 2-continued

|  | CB1 | CB2 | CB3 | CB4 | CB5 | CB6 |
|---|---|---|---|---|---|---|
| Raw material supply part (distance mm from lower stream end of narrow cylindrical part to upper stream side) | 150 | 394 | 394 | 394 | 394 | 394 |
| Reaction termination part (distance mm from lower stream end of narrow cylindrical part to lower stream side) | 700 | 900 | 700 | 500 | 900 | 500 |

Production Example 7

Production of Modified Butadiene Rubber (Modified BR)

A pressure proof vessel of 800 mL which was dried and replaced with nitrogen gas was charged with a cyclohexane solution (20% by mass) of 1,3-butadiene 60 g, and 2,2-ditetrahydrofurylpropane 0.70 mmol and further charged with n-butyllithium (BuLi) 0.70 mmol, and then they were subjected to polymerization reaction for 1.5 hour in a warm water bath of 50° C. The polymerization conversion rate was almost 100%.

Then, tin tetrachloride ($SnCl_4$) 0.2 mmol was added to the polymerization system to carry out modification reaction for 30 minutes. Lastly, an isopropanol 5 mass % solution of 2,6-di-t-butyl-p-cresol (BHT) 2 mL was added to the polymerization reaction system to terminate the reaction. Thereafter, the reaction product was subjected to vacuum drying to obtain modified BR.

The copolymer thus obtained had a weight average molecular weight of 100,000.

Measuring the properties of the carbon blacks CB used in the examples and the comparative examples and evaluating the characteristics of the rubber compositions obtained were carried out by the following methods.

Measurement of CB:

1. Iodine Adsorption Specific Surface Area

Measured according to JIS K6217-1 and shown by an adsorption value mg/g of iodine per a unit mass of carbon black.

2. $N_2SA$ Adsorption Specific Surface Area

Measured according to JIS K6217-2 and shown by a specific surface area $m^2/g$ per a unit mass of carbon black.

3. CTAB Adsorption Specific Surface Area

Measured according to JIS K6217-3 and shown by a specific surface area $m^2/g$ per a unit mass of carbon black.

4. DBP Absorption

Measured according to JIS K6217-4 absorption method A and shown by a volume ml of dibutyl phthalate (DBP) absorbed per 100 g of carbon black.

5. Tinting Strength

Measured by a Photochron method described in JIS K6217-5.

6. Light Transmittance of Toluene Extract

Measured according to JIS K6218-4 and shown by a percentage obtained by comparing it with that of purified toluene.

7. Hydrogen Release Rate

1) A carbon black sample is dried in a constant temperature dryer of 105° C. and cooled down to room temperature in a desiccator.

2) The sample 10 mg is precisely weighed into a tin-made tubular sample vessel, and it is pressed and tightly sealed.

3) It is heated at 2000° C. for 15 minutes under an argon stream by means of a hydrogen analyzer (EMGA621W manufactured by Horiba, Ltd.) to measure an amount of hydrogen generated and determine a mass fraction.

Abrasion Resistance:

After allowing an actual vehicle to run 10,000 km on a paved road, remaining depth of grooves was measured, and a running distance required for abrasion 1 mm in a tread was relatively compared and shown by an index, wherein the value of the comparative example was set to 100 (corresponding to 8000 km/mm). It is shown that the larger the numerical value is, the better the abrasion resistance is.

Low Fuel Consumption:

A tire having a size of 195/65R15 was produced and rotated by means of a rotating drum at a speed of 80 km/hour to measure a rolling resistance with a load set to 4.4 kN. It was shown by an index, wherein a reciprocal of the rolling resistance of the comparative example was set to 100. It is shown that the larger the numerical value is, the lower the rolling resistance is, and the lower the fuel consumption is.

Wet Grip Performance (0° C., Tan δ):

A viscoelasticity measuring equipment (manufactured by Rheometric Corporation) was used to measure a loss tangent tan δ at a temperature of 0° C., a distortion of 1% and a frequency of 15 Hz. It was shown by an index, wherein the numerical value of the comparative example was set to 100. It is shown that the larger the numerical value is, the better the wet grip performance is.

The properties of the carbon blacks CB1 to 6 used in the examples and the comparative examples were measured by the measuring methods described above, and the results thereof are shown in Table 3.

TABLE 3

|  |  | CB1 | CB2 | CB3 | CB4 | CB5 | CB6 |
|---|---|---|---|---|---|---|---|
| IA | mg/g | 142 | 251 | 252 | 240 | 221 | 247 |
| DPB absorption | ml/100 g | 125 | 136 | 127 | 123 | 135 | 135 |
| $N_2SA$ | $m^2/g$ | 147 | 226 | 225 | 221 | 200 | 219 |
| Tinting strength |  | 134 | 139 | 142 | 140 | 135 | 137 |
| Released hydrogen | % | 0.332 | 0.184 | 0.207 | 0.243 | 0.214 | 0.256 |
| $N_2SA$/CTAB |  | 1.06 | 1.30 | 1.30 | 1.27 | 1.27 | 1.35 |

TABLE 3-continued

|  | CB1 | CB2 | CB3 | CB4 | CB5 | CB6 |
|---|---|---|---|---|---|---|
| Light transmittance of toluene extract | 86 | 100 | 100 | 100 | 100 | 100 |

Examples 1 to 4 and Comparative Examples 1 to 2

Six kinds of carbon blacks shown in Table 3 were used, and mixtures using only SBR as the rubber component according to recipes shown in Table 4 were kneaded by means of a Banbury mixer to prepare rubber compositions.

The respective rubber compositions thus obtained were evaluated by the evaluating methods described above. The results thereof are shown in Table 4.

TABLE 4

|  | Comparative Example | | Example | | | |
|---|---|---|---|---|---|---|
|  | 1 | 2 | 1 | 2 | 3 | 4 |
| SBR *1 | 100 | 100 | 100 | 100 | 100 | 100 |
| Kind of CB | CB1 | CB2 | CB3 | CB4 | CB5 | CB6 |
| CB | 15 | 15 | 15 | 15 | 15 | 15 |
| Silica *4 | 60 | 60 | 60 | 60 | 60 | 60 |
| Silane coupling agent *5 | 6 | 6 | 6 | 6 | 6 | 6 |
| Stearic acid | 2 | 2 | 2 | 2 | 2 | 2 |
| Antioxidant 6C *6 | 1 | 1 | 1 | 1 | 1 | 1 |
| Zinc oxide | 3 | 3 | 3 | 3 | 3 | 3 |
| Vulcanization accelerator DPG *7 | 1 | 1 | 1 | 1 | 1 | 1 |
| Vulcanization accelerator DM *8 | 1 | 1 | 1 | 1 | 1 | 1 |
| Vulcanization accelerator NS *9 | 1 | 1 | 1 | 1 | 1 | 1 |
| Sulfur | 1.5 | 1.5 | 1.5 | 1.5 | 1.5 | 1.5 |
| Abrasion resistance | 100 | 102 | 103 | 102 | 103 | 102 |
| Low fuel consumption | 100 | 96 | 96 | 97 | 97 | 98 |
| Wet grip performance | 100 | 99 | 100 | 100 | 101 | 100 |

Examples 5 to 8 and Comparative Examples 3 to 4

Six kinds of carbon blacks shown in Table 3 were used, and mixtures using SBR and a commercially available butadiene rubber as the rubber components according to recipes shown in Table 5 were kneaded by means of the Banbury mixer to prepare rubber compositions.

The respective rubber compositions thus obtained were evaluated by the evaluating methods described above. The results thereof are shown in Table 5.

TABLE 5

|  | Comparative Example | | Example | | | |
|---|---|---|---|---|---|---|
|  | 3 | 4 | 5 | 6 | 7 | 8 |
| SBR *1 | 80 | 80 | 80 | 80 | 80 | 80 |
| BR *2 | 20 | 20 | 20 | 20 | 20 | 20 |
| Kind of CB | CB1 | CB2 | CB3 | CB4 | CB5 | CB6 |
| CB | 15 | 15 | 15 | 15 | 15 | 15 |
| Silica *4 | 60 | 60 | 60 | 60 | 60 | 60 |
| Silane coupling agent *5 | 6 | 6 | 6 | 6 | 6 | 6 |
| Stearic acid | 2 | 2 | 2 | 2 | 2 | 2 |
| Antioxidant 6C *6 | 1 | 1 | 1 | 1 | 1 | 1 |
| Zinc oxide | 3 | 3 | 3 | 3 | 3 | 3 |
| Vulcanization accelerator DPG *7 | 1 | 1 | 1 | 1 | 1 | 1 |
| Vulcanization accelerator DM *8 | 1 | 1 | 1 | 1 | 1 | 1 |
| Vulcanization accelerator NS *9 | 1 | 1 | 1 | 1 | 1 | 1 |
| Sulfur | 1.5 | 1.5 | 1.5 | 1.5 | 1.5 | 1.5 |
| Abrasion resistance | 100 | 102 | 105 | 106 | 105 | 105 |
| Low fuel consumption | 100 | 98 | 99 | 98 | 99 | 100 |
| Wet grip performance | 100 | 100 | 100 | 99 | 100 | 101 |

Examples 9 to 13 and Comparative Examples 5 to 6

Six kinds of carbon blacks shown in Table 3 were used, and mixtures using SBR and the modified butadiene rubber produced in Production Example 7 as the rubber components according to recipes shown in Table 6 were kneaded by means of the Banbury mixer to prepare rubber compositions.

The respective rubber compositions thus obtained were evaluated by the evaluating methods described above. The results thereof are shown in Table 6.

TABLE 6

|  | Comparative Example | | Example | | | | |
|---|---|---|---|---|---|---|---|
|  | 5 | 6 | 9 | 10 | 11 | 12 | 13 |
| SBR *1 | 80 | 80 | 80 | 80 | 80 | 80 | 80 |
| Modified BR *3 | 20 | 20 | 20 | 20 | 20 | 20 | 20 |
| Kind of CB | CB1 | CB2 | CB3 | CB4 | CB5 | CB6 | CB6 |
| CB | 15 | 15 | 15 | 15 | 15 | 15 | 30 |
| Silica *4 | 60 | 60 | 60 | 60 | 60 | 60 | 50 |
| Silane coupling agent *5 | 6 | 6 | 6 | 6 | 6 | 6 | 6 |
| Stearic acid | 2 | 2 | 2 | 2 | 2 | 2 | 2 |
| Antioxidant 6C *6 | 1 | 1 | 1 | 1 | 1 | 1 | 1 |
| Zinc oxide | 3 | 3 | 3 | 3 | 3 | 3 | 3 |
| Vulcanization accelerator DPG *7 | 1 | 1 | 1 | 1 | 1 | 1 | 1 |
| Vulcanization accelerator DM *8 | 1 | 1 | 1 | 1 | 1 | 1 | 1 |
| Vulcanization accelerator NS *9 | 1 | 1 | 1 | 1 | 1 | 1 | 1 |
| Sulfur | 1.5 | 1.5 | 1.5 | 1.5 | 1.5 | 1.5 | 1.5 |
| Abrasion resistance | 100 | 105 | 112 | 110 | 110 | 111 | 121 |
| Low fuel consumption | 100 | 98 | 99 | 100 | 100 | 102 | 95 |
| Wet grip performance | 100 | 100 | 100 | 101 | 100 | 101 | 99 |

Notes (Tables 4 to 6)
*1: SBR #1500 (manufacture by JSR Corporation)
*2: BR NF35R (manufacture by Asahi Kasei Corporation)
*3: produced in Production Example 7

*4: Nipsil AQ (manufactured by Tosoh Silica Corporation)
*5: Si69 (bis(3-triethoxysilylpropyl) tetrasulfide, manufacture by Evonik Industries AG)
*6: NOCRAC 6C (N-(1,3-dimethylbutyl)-N'-phenyl-p-phenylenediamine, manufactured by Ouchi Shinko Industrial Co., Ltd.)
*7: NOCCELER D (diphenylguanidine, manufactured by Ouchi Shinko Industrial Co., Ltd.)
*8: NOCCELER DM-P (benzothiazyl disulfide, manufactured by Ouchi Shinko Industrial Co., Ltd.)
*9: NOCCELER NS-P (N-t-butyl-2-benzothiazylsulfenamide, manufactured by Ouchi Shinko Industrial Co., Ltd.)

As apparent from the results shown in Tables 4 to 6, it is found that the rubber compositions of the present invention prepared by using carbon blacks having a hydrogen release rate which falls in the range prescribed in the present invention are a little reduced in a low fuel consumption but improved in abrasion resistance as compared with the rubber compositions prepared by using conventional carbon blacks or carbon blacks having a hydrogen release rate which falls outside the range prescribed in the present invention. In particular, when BR and modified BR are used for the rubber component in combination with SBR, the low fuel consumption is not reduced as well, and the abrasion resistance is improved to a large extent.

INDUSTRIAL APPLICABILITY

The rubber compositions of the present invention can be used for tires of cars.

What is claimed is:

1. A rubber composition prepared by compounding 100 parts by mass of a rubber component comprising a styrene-butadiene rubber or a styrene-butadiene rubber and a butadiene rubber with 2 to 200 parts by mass of carbon black and 20 to 130 parts by mass of silica as a reinforcing filler, wherein the carbon black has the following characteristics:
    (1) a hydrogen release rate of 0.2% by mass or more,
    (2) a ratio $N_2SA/CTAB$ of 1.2 to 1.5 in which $N_2SA$ is a nitrogen adsorption specific surface area and CTAB is a cetyltrimethylammonium bromide adsorption specific surface area,
    (3) a nitrogen adsorption specific surface area $N_2SA$ of 180 to 300 $m^2/g$,
    (4) an iodine adsorption specific surface area IA of 180 to 300 mg/g,
    (5) a dibutyl phthalate absorption amount DBP of 100-150 ml/100 g,
    (6) a tinting strength TINT of 120-150, and
    (7) light transmittance of toluene extract of 90 or more.
2. The rubber composition as described in claim 1, wherein a content of the butadiene rubber in the rubber component is 40% by mass or less.
3. The rubber composition as described in claim 1, wherein the butadiene rubber in the rubber component is a modified butadiene rubber.
4. The rubber composition as described in claim 1, wherein a blending amount of the carbon black is 2 to 50 parts by mass based on 100 parts by mass of the rubber component.
5. A tire prepared by using the rubber composition as described in claim 1.

* * * * *